United States Patent

Bedi et al.

[11] Patent Number: 5,526,782
[45] Date of Patent: Jun. 18, 1996

[54] FILTER MOUNT

[75] Inventors: Ram D. Bedi; Adrianus J. van der Griendt, both of Bloomfield Hills, Mich.

[73] Assignee: K. J. Manufacturing Co., Wixom, Mich.

[21] Appl. No.: 511,653

[22] Filed: Aug. 7, 1995

[51] Int. Cl.⁶ ..................................................... F16C 3/14
[52] U.S. Cl. ....................................... 123/196 A; 184/1.5
[58] Field of Search .......................... 123/196 R, 196 A; 184/1.5

[56] References Cited

U.S. PATENT DOCUMENTS

| | | |
|---|---|---|
| 2,320,048 | 5/1943 | Parson . |
| 3,557,767 | 1/1971 | Green . |
| 3,871,483 | 3/1975 | Espinosa et al. . |
| 4,086,981 | 5/1978 | Mitsui . |
| 4,592,448 | 6/1986 | Morris . |
| 4,745,894 | 5/1988 | Laipply et al. . |
| 4,865,156 | 9/1989 | Poling . |
| 4,951,784 | 8/1990 | Bedi . |
| 4,964,373 | 10/1990 | Bedi . |
| 4,977,928 | 12/1990 | Smith et al. . |
| 4,977,978 | 12/1990 | Batrice . |
| 5,044,334 | 9/1991 | Bedi . |
| 5,062,398 | 11/1991 | Bedi et al. . |
| 5,090,376 | 2/1992 | Bedi . |
| 5,094,201 | 3/1992 | Bedi . |
| 5,154,775 | 10/1992 | Bedi . |
| 5,168,844 | 12/1992 | Waelput . |
| 5,209,198 | 5/1993 | Bedi . |
| 5,236,064 | 8/1993 | Wagoner . |
| 5,246,086 | 9/1993 | Yunick . |
| 5,263,445 | 11/1993 | Bedi et al. . |

*Primary Examiner*—Erick R. Solis
*Attorney, Agent, or Firm*—Young & Basile

[57] ABSTRACT

A method and device for changing oil in a safe manner and on an internal combustion engine having an internal oil lubrication distribution passage system with an oil filter and oil reservoir including an apparatus and receptacle for evacuating fluid from the oil reservoir, a pump and receptacle with a fresh oil supply for introducing into the engine oil reservoir through the oil filter and internal oil lubrication system. An electronic module is on the vehicle for communicating pertinent information to the apparatus for changing oil and signals to facilitate the oil changing process in an easy and safe manner including a signal to indicate an engine running condition and a signal for the oil filter-in-place condition, so that the device can deactivate when the engine is running or the oil filter is disengaged or not properly engaged to the engine. The device further including an adapter projecting outwardly from engine block having a mounting face for the oil filter and a pair of quick connect nipples, the first nipple communicating passage to the inlet side of oil filter, the second nipple communicating passage to connection to the oil reservoir.

13 Claims, 2 Drawing Sheets

FILTER MOUNT

BACKGROUND OF THE INVENTION

1. Field of the Invention

The invention relates to a apparatus and method for changing motor oil in an internal combustion engine having an oil pan or similar oil reservoir. Such reservoirs can be found in automobiles, trucks, tractors, heavy earth moving equipment, military equipment, or the like. More particularly, this invention relates to an apparatus and method in which introduction of engine oil can be accomplished at a location adjacent or closely proximate to the engine oil filter unit. More particularly, this invention relates to methods in which spent or dirty oil is expediently removed from the oil pan and analyzed as to amount and condition, the lubrication passages thereafter flushed with flushing fluid to remove contaminants, and then the lubrication system crankcase and oil pan are refilled with a measured amount of fresh oil appropriate for the engine.

2. Background of the Relevant Art

The benefits of routine oil changes in an internal combustion engine are well known. Routine oil changes have been shown to increase engine life and performance. With repeated prolonged use, motor oil builds up suspended particles, metallic and non-metallic, from the abrasive and adhesive wear of engine parts against one another and from products of incomplete combustion and improper air intake. The particles in turn cause abrasive wear of the engine bearings, piston rings and other moving parts and the reduction of the motor oil lubricity as various additives and lubricating components become depleted. This adversely affects engine performance and if left unchanged can destroy or cripple the engine performance. It is recommended by at least one oil manufacturer that the level of total solid concentration be limited to levels below 3.0% with levels of silica being present in amounts lower than 25 parts per million and sodium in amounts lower than 200 parts per million.

To obtain satisfactory engine performance, and maintain solids concentration levels in the motor oil lower than the recommended 3.0%, changing the motor oil in an internal combustion engine is a necessary, but an inconvenient, dirty and time-consuming task. In currently designed vehicles, the oil pan serves the purpose of a reservoir for circulation of engine oil. Engine lubrication is generally accomplished through a gear-type pump. The pump picks up engine oil from the oil pan sump, where oil is drawn up through the pick-up screen and tube, and passed through the pump to the oil filter. The oil filter is generally a full flow paper element unit. In some vehicles, an oil filter bypass is used to insure adequate oil supply, should the filter become plugged or develop excessive pressure drop. Oil is routed from the filter to the main oil gallery. The oil gallery supplies valve train components with oil, and by means of intersecting passages, supplies oil to the cam shaft bearings. Oil draining back from the rocker arms is directed, by cast dams in the crank case casting, to supply the cam shaft lobes. Oil also drains past specific hydraulic lifter flats to oil cam shaft lobes directly. The passages supplying oil to the cam shaft bearings also supply the crank shaft main bearings through intersecting passages. Oil from the crank shaft main bearings is supplied to the connecting rod bearings by means of intersecting passages in the crank shaft. The front cam bearing can include a slot on its outside diameter to supply oil to the cam sprocket thrust face. In some engines, many internal engine parts have no direct oil feed and are supplied either by gravity or splash from other direct feed components. A bypass valve can also be disposed in the oil pick-up screen to insure adequate oil flow if the screen should become restricted. A pressure regulator valve, sometimes located in the oil pump body, maintains adequate pressure for the lubrication system and bypasses any excess back to the suction side of the pump. Oil from the pump passes through the filter before going to the engine oil galleries. In the filter, the oil passes through a filtering element where dirt and foreign particles are removed.

To remove the contaminated oil, the drain plug, generally located in the suitable portion of the oil pan, is opened. The spent oil containing suspended particles is permitted to flow under gravity out of the pan into a suitable receptacle. After the spent oil is removed, the plug is replaced and fresh oil is added to the engine usually through a separate opening in the engine valve cover. The process of gravity drainage does not remove all of the spent oil from the oil galleries with its metallic and non-metallic particulates which remain stuck to the gallery walls, as well as engine components such as the crank shaft, connecting rods, pistons and the like which are exposed to the motor oil spray lubrication. These particles remain to be mixed with fresh motor oil. Thus the concentration of contaminants is not completely eliminated.

The oil change process is essentially the same whether performed at home, at service stations or at one of the various oil change centers which have opened in recent years. The flow rate, or time required for oil drainage, is the same for each of these locations, because it is limited by the size of the drain plug aperture and the force of gravity. Service stations and other locations simplify the process of oil drainage with the use of hydraulic racks, special oil collection receptacles and the like. However, this specialized and expensive equipment is not readily available to the typical automotive owner who may wish to change the oil in his vehicle. It has been estimated that the retail market of oil is approximately 2.83 billion quarts or approximately 700 million gallons. The do-it-yourself individual has been found to be price sensitive, and tends to distrust the quality of service stations and other oil change centers. The do-it-yourself individual typically believes that if you want a job done right, you do it yourself. However, the current design of vehicles does not lend itself to do-it-yourself oil changes in a convenient clean and effortless manner. Many vehicles have low ground clearance making it difficult to access the oil drain plug for removal of the spent oil, and also making it difficult to collect the oil without contaminating the surrounding environment.

Regardless of the manner in which oil change is accomplished, it has long been appreciated that engine oil consumption can be indicative of engine performance and general engine condition. Excessive oil consumption can be indicative of engine problems such as malfunctioning piston rings, leaking and sagging exterior gaskets and seals or a lack of integrity in seals between the oil passages and coolant system. Information about specific increases in oil consumption would be of value to the vehicle owner to assist him in scheduling appropriate engine maintenance and repair before minor engine problems become major mechanical failures which compromise engine performance and engine life and introduce engine oil contaminants to be environment either as products of combustion or as leakage which can indiscriminately contaminate surfaces of the exterior engine compartment, as well as road and garage surfaces.

Environmental protection is a prominent social issue in our present society. Therefore, it would be desirable to encourage that all oil changes be performed in the most environmentally safe manner possible. It is estimated that there are approximately 119 million privately owned passenger vehicles. These vehicles require approximately 360 million oil changes a year, using an average of 1.2 gallons per change based on an average oil change frequency of 2.94 times a year. This amounts to approximately 550 million gallons of motor oil changed per year. Of this amount, it is estimated that 70% of motor oil is installed by motorists themselves. It is believed that pursuant to present practice, the spent oil drained by motorists finds its way into spent household containers, such as milk cartons and the like. The household containers are closed and disposed of in the garbage which can and will finally find its way into the local waste dump. As the household container deteriorates, the oil and its contaminates will eventually seep into the surrounding ground and any ground water below the dump site. It has been estimated that 300 million gallons of oil a year seep into U.S. soil creating serious potential ground water pollution problems. It would be desirable environmentally and economically if this oil could be collected and recycled. In order to motivate the do-it-yourself market, it is desirable in the present invention to make the collection of oil during oil changes quick, effortless, clean and inexpensive.

In establishing a system for encouraging oil recycling and resource recovery, it is also highly desirable to provide an oil change system which is self-documenting. By this, it is meant that the system is capable of accurately measuring and recording the amount of spent oil removed from various engines and the amount of fresh oil introduced into these engines. Accurate records of the amount of spent oil collected can be valuable in producing any waste manifests required under existing environmental protection and/or resource recovery laws.

Such records would provide regulatory agencies with an accurate indication of an oil handler's compliance with existing laws. The records would also be valuable to the operator of any oil change service by providing him with documentation demonstrating his adherence to all applicable laws and an opportunity to assist his customers in evaluating the need for overall engine maintenance.

Conservation of energy and the trade deficit are also major issues in today's society. It is estimated that 225–250 million gallons of spent oil can now be easily collected and profitably recycled. The price of spent oil so collected is four dollars per barrel at best, while the price of crude oil is much greater at approximately $18.00 per barrel. Recycling easily collected spent oil could decrease the trade deficit by approximately 80–100 million dollars, while providing a profitable recycling economy of approximately 75 million dollars per year.

Therefore, it would be desirable to provide a method which accelerates removal of spent oil completely and easily from the crank case. It would also be desirable to provide a system which reduces the amount of spent oil handling as required in the conventional oil change service station. It would also be desirable to provide a system which permits accurate assessment of the amount of oil expended and recovered. Finally, it is desirable to provide a method which could be easily employed by all vehicle owners at a convenient location with all the benefits of the method of the present invention such as time savings, money savings, convenience, minimum exposure to motor oil, environmental protection, energy conservation, trade deficit reduction, and finally longer lasting, better performing engines.

SUMMARY OF THE INVENTION

The present invention includes an apparatus external and separable from the internal combustion engine. The external device would be operably connectible to fresh oil storage means, flushing fluid storage means, waste oil storage means and dispense flushing fluid storage means. The external apparatus preferably includes air purge means for purging fluid retained within the oil filter element and any fluid remaining in the lubrication system passages of the internal combustion engine, such that all waste fluid can be deposited within the oil pan reservoir. The pump means of the external apparatus draws waste fluid from the oil pan reservoir for its deposit into an appropriate waste storage or disposal device.

The present invention further includes safety features and computerized vehicle information incorporated for the external apparatus to facilitate the oil change process and to deactivate the oil change process under certain conditions. The safety features may include a signal to the external apparatus via an on-board sensing system (on the engine) whether or not the oil filter is securely in place. If the oil filter is not securely in place, the external apparatus will not activate the purge air or oil filling process. Another safety feature provides information to the external apparatus via another sensing system whether or not there is oil pressure present, indicating that the engine is running. Under this condition, the external apparatus will not proceed with the oil changing process until it is confirmed that the engine is not running. In addition, the external apparatus may be provided with information that facilitates the oil change process. Information relating to the vehicle, such as vehicle I.D., the capacity of the oil reservoir, as well as history of previous oil changes can be stored in a vehicle electronic module. Connection of the vehicle to the external apparatus allows a computer in the external apparatus to read as well as update or change this information and also to read the safety signals located in the vehicle electronic module. This vehicle information accelerates the oil change process by eliminating manual entries, such as volume of fresh oil needed as specified by the manufacturer for this vehicle as well as potential error as a result of the manual entries.

The present invention further includes a suitable oil filter mounting adapter which includes a bracket and fitting which project directly outward from an easily accessible location of the engine block and is adapted to be sealingly mounted to the outer wall of the engine block in a permanent or essentially permanent manner. The adapter includes a bracket having an engine block wall engaging face and an oil filter mounting face located at a position perpendicular to the engine block wall engaging face. The adapter includes a housing having a first oil passage which extends from an oil inlet aperture located in the oil filter mounting face to an oil outlet port located in the engine block wall engaging face to convey newly filtered oil from the oil filter attached to the filter mounting face to the internal lube oil distribution passages of the internal combustion engine when the adapter is in operational engagement with the associated engine block. The housing also includes a second oil passage which is sealingly connected and extends from the bottom of the oil pan.

The device also includes suitable means for maintaining an oil filter unit in sealing engagement with the oil filter mounting face of the oil filter mounting bracket and means for securely attaching the oil filter mounting bracket to the outer wall of the associated internal combustion engine. The bracket is secured to the engine block by means of a banjo fitting, which threads into the nipple of the engine block. Sealing is accomplished in the same manner as a conventional spin-on oil filter, i.e. by means of a gasket between the bracket and the engine block. The banjo fitting having female threads allows for direct installation on existing engines without having to remove the nipple. At the filter mounting face of the bracket, the oil filter can be mounted to the bracket in the conventional manner, i.e. onto a nipple with a gasket used for sealing. The bracket is able to rotate and can therefore be positioned in any direction. In order to achieve a more complete emptying of the oil filter in the oil change process that uses purge air, it is desirable to have the filter and bracket positioned such that the filter is mounted in an upside down position.

In order to facilitate introduction of oil into the internal combustion engine, the device as disclosed includes a quick connect coupling nipple positioned adjacent to the filter mounting bore. The coupling nipple extends through the housing into fluid contact with one of the two oil passages extending through the adapter. The coupling nipple is releasibly matingly connectible with a mating coupling member in fluid contact with the external pump mechanism.

The bracket further includes a suitable oil drain plug connection. The oil drain plug connection is in fluid communication with a suitable portion of the oil pan reservoir and includes a passage and openings adapted to receive a hose connection.

In operation, the present invention provides a method for quickly and efficiently removing, measuring and recording the amount of waste oil present in an internal combustion engine, replenishing the lubrication system of an internal combustion engine with an appropriate, measured amount of fresh oil and replenishing the engine with fresh oil. Additionally, the present invention provides purging of fluid from the oil filter element of the internal combustion engine with pressurized air or pressurized gas means. Furthermore, all fluids introduced into the internal combustion engine first flow through the oil filter element of the internal combustion engine and then pass through the lubrication passages within the internal combustion engine prior to accumulating within the oil pan reservoir of the internal combustion engine. Further, the invention provides safety features and vehicle information to provide expedient and efficient means for safely purging fluid from the oil filter element internal lubrication passages within the internal combustion engine and recharging the oil filter and internal passages with fresh oil during the fresh oil introduction phase.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
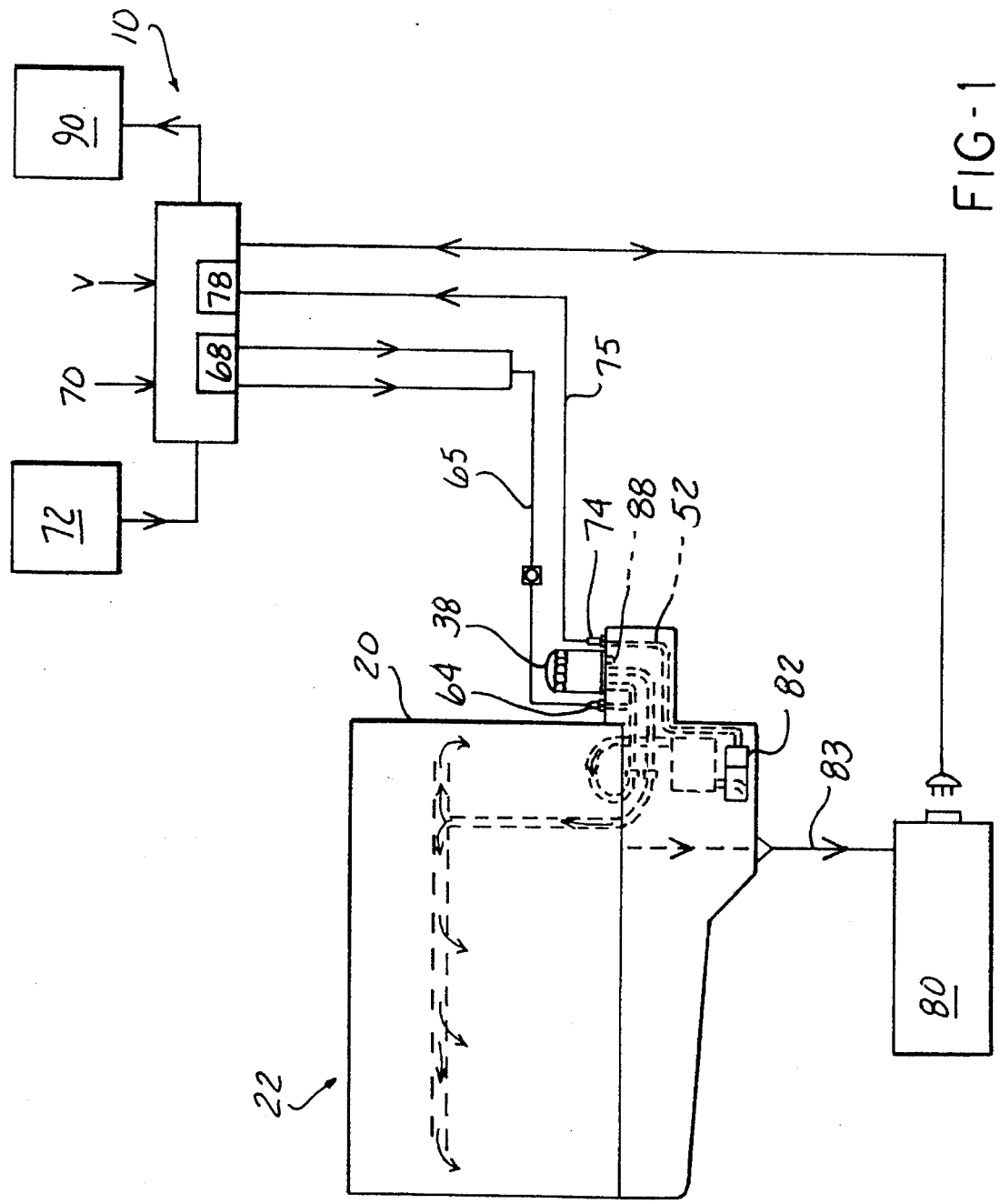
FIG. 1 is a schematic view of an oil change apparatus according to the present invention.
Figure 2:
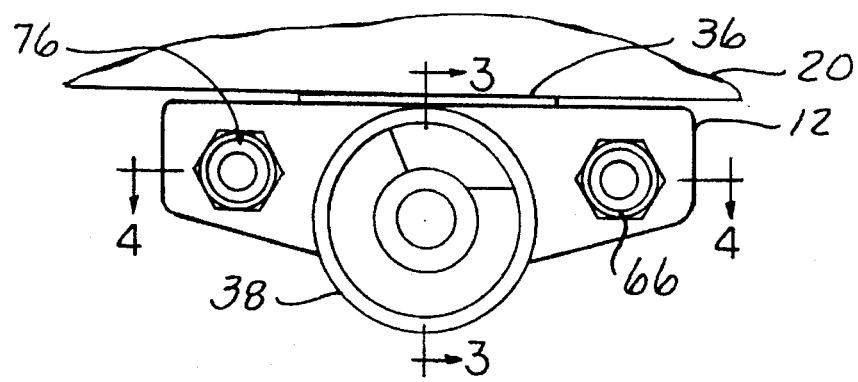
FIG. 2 is a top view of an oil filter mounting adapter according to the present invention.
Figure 3:
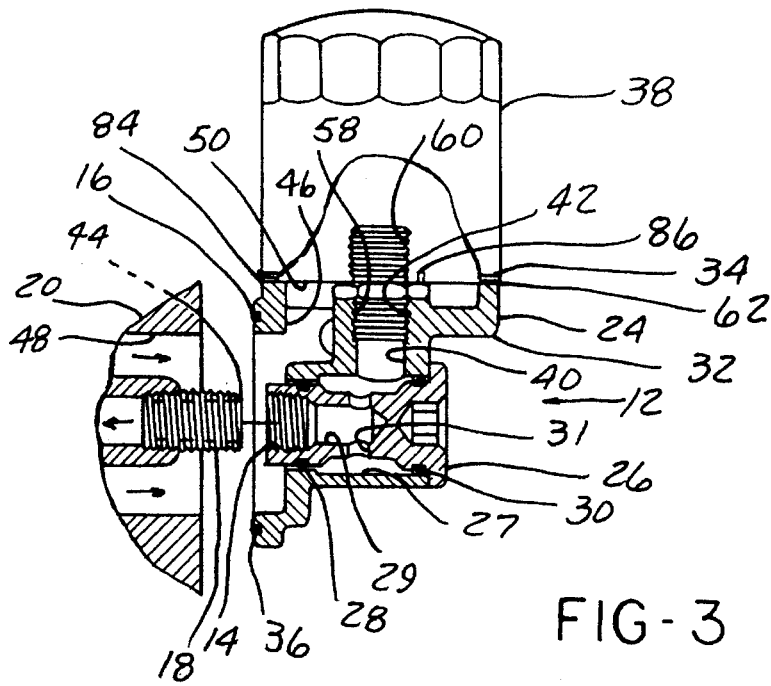
FIG. 3 is a cross-sectional view of the oil filter mounting adapter taken along the line 3—3 as shown in FIG. 2.
Figure 4:
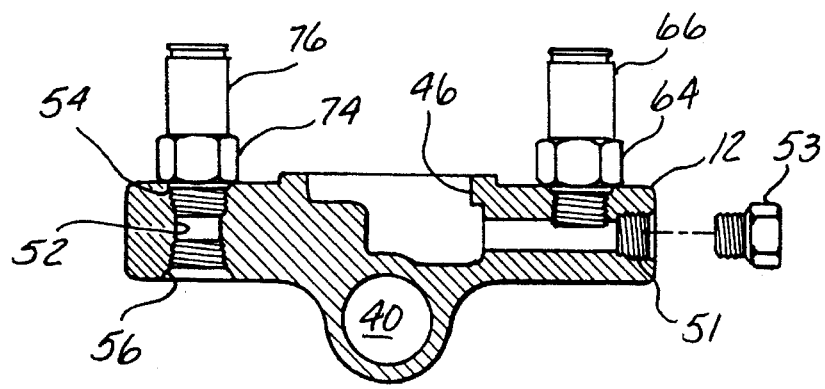
FIG. 4 is a cross-sectional view of the oil filter mounting adapter taken along the line 4—4 as shown in FIG. 2.

The apparatus of the present invention is depicted schematically in FIG. 1 and includes the oil filter adapter 12 shown in detail in FIGS. 2–4. The oil filter mounting adapter 12 is adapted to be directly and securely fastened to the outer wall of the engine block 20 of the internal combustion engine 22. The oil filter adapter 12 has an interior threaded surface 14 and a suitable sealing member, such as a sealing gasket 16, which will permit it to be inserted into the oil filter mounting boss 18 located on the engine block 20 of the internal combustion engine 22. The adapter 12 for facilitating introduction of oil into the internal combustion engine 22 comprises the oil filter mounting bracket 24 and a banjo fitting 26. The banjo fitting 26 is secured within bore 27 in mounting bracket 24 with suitable sealing means, such as sealing gaskets 28 and 30. Banjo fitting 26 has an axial bore 29 and an annular space 31 therein for providing fluid passages through adapter 12. The outer housing 32 of adapter 12 includes an oil filter mounting face 34 and an engine block wall engaging face 36. The bracket 24 is preferably oriented such that the oil filter mounting face 34 is positioned upwardly, so that the oil filter 38 is upside down to its normal conventional position to facilitate the complete emptying of the oil filter 38 in the oil change process. Preferably, the oil filter 38 will have an anti-drain valve to keep the oil from draining out when engine 22 is not running. Although the adapter 12 is shown with the oil filter 38 in the preferred upside down position, the adapter 12 is able to rotate 360 degrees relative to oil filter mounting boss 18 on the engine block 20 so that the adapter 12 can position the oil filter 38 in any direction to accommodate underhood space.

The housing 32 of the adapter 12 also includes a first oil passage 40 partially defined by axial bore 29 and annular space 31 extending through the housing 32 from the oil outlet aperture 42 located in the oil filter mounting face 34 to an oil inlet port 44 located in the engine block wall engaging face 36. In this manner, oil can be carried from a suitable mounted oil filter 38 in the first oil passage 40 and conveyed into the internal lubrication distribution passage contained in the engine block 20. The housing 32 of the adapter 12 also includes a second oil passage 46 extending through the housing 32 from an oil outlet aperture 48 located in the engine block wall engaging face 36 to an oil inlet port 50 located in the oil filter mounting face 34. In this manner, unfiltered oil can be conveyed ultimately from the oil pan through the engine block 20 and flows through the adapter 12 into communication with the oil filter 38 for filtration and recirculation back into the engine block 20. For manufacturing purposes and for access to oil passage 46, the adapter 12 may have a threaded aperture 51 through the housing 32 to oil passage 46. A threaded plug 53 closes aperture 51 during use.

The outer portion of housing 32 of the bracket further includes a straight through oil passage 52 extending through the housing 32 from an oil drain connection aperture 54 located in the oil filter mounting face 34 through the housing to the opposing side 56 of the housing 32 from the oil filter mounting face 34. The passage 52 is opened for connection to the lowest port of the oil pan 82.

The adapter 12 also includes means for maintaining the oil filter unit in sealing engagement with the oil filter mounting face. As shown in FIG. 3, the maintenance means includes a centrally threaded nipple 58 attached to oil outlet aperture 42. The threaded nipple 58 protrudes downward and outward from the oil filter mounting face 34 to threadingly engage mating interior threads 60 located in a central aperture in the oil filter unit 38. The device can also include a suitable sealing means 62, such as a gasket which extends along the outer periphery of the mount engaging face 34 of the oil filter unit 38. In this manner, the oil filter unit 38 can be brought into sealing orientation overlying the oil filter mounting face 34.

The device of the present invention also includes suitable means for attaching the oil filter adapter to the outer wall of the internal combustion engine. Preferably, the bracket mounting means are located such that the oil inlet aperture and the oil outlet port are brought into contiguous fluid communication with analogous ports located in and extending through the engine block. In the preferred embodiment, the attachment means comprises the threaded nipple 18 extending outwardly from the engine block wall to threadingly engage mating interior threads 14 located in a central aperture in the bracket on the engine block wall engaging face. The banjo fitting 26 with female threads 14 allows for direct installation on existing engines without having to remove nipple 18. An alternate design would eliminate nipple 18 and have male threads on banjo fitting 26, which would directly thread into the engine block 20, where the nipple 18 would otherwise be threaded. The adapter may also include a suitable sealing means, such as an O-ring 16, which extends along the outer periphery of the engine block wall engaging face 36 of the bracket. In this manner, the adapter 12 can be brought into sealing orientation overlying the engine block surface. The bracket is rotatable around filtered oil passage such that the adapter 12 may be rotated in any position. It is preferable though to have the adapter 12 oriented such that the oil filter mounting face 34 is directed upwardly so that the oil filter 38 is easily accessible and such that the oil drain quick connect 74 and filter inlet quick connect 64 is easily accessible.

The adapter 12 of the present invention further includes a first quick connect coupling nipple 64 positioned in the oil filter mounting face 34 adjacent to the oil filter 38. The first quick connect coupling nipple 64 includes an outer portion 66 which preferably extends outward from the surface of the adapter housing 32. The outer portion 66 of the first quick connect coupling nipple 64 is adapted to be received within a mating portion of a quick connect coupling member to bring the adapter into fluid communication with the external pump apparatus 68 such as described in conjunction with FIG. 1. The quick connect coupling nipple 64 is positioned such that the coupling nipple is placed in fluid communication with the oil conveying passage 46. In this manner, when the mating portion of the quick connect coupling member is brought into contact with the quick connect coupling nipple 64 during an oil change operation, purge air 70 and/or new, replacement oil from an oil supply reservoir 72 can be conveyed into the oil passage, on through the oil filter 38 and into the internal lubrication distribution passages of the engine block 22.

The adapter 12 further includes a second quick connect coupling nipple 74 positioned in the oil filter mounting face 34 adjacent to the oil filter 38, wherein the oil filter 38 is disposed between the first quick connect coupling nipple 64 and second quick connect coupling nipple 74. The second quick connect coupling nipple 74 also includes an outer portion 76 which extend outward from the surface of adapter housing 32. Outer portion 76 is adapted to be received within a mating portion of a quick connect coupling member to bring the adapter 12 into fluid communication with external pump device 78 of the oil exchange apparatus. The second quick connect coupling nipple 74 is positioned such that the coupling nipple 74 is placed in fluid communication with the straight through oil passage 52 that extends through the housing and in fluid communication to the bottom of the oil pan 82 for evacuation of the waste oil.

In operation, the internal combustion engine 22 is brought into proximity with the oil changing apparatus 10. The fluid conduit hose from the oil exchanger having a first quick connect coupling 75 is connected to the oil drain connection 74 on the adapter 12. The oil drain connection 74 is fluidly connected to an appropriate drain connection from the oil reservoir 82 of the internal combustion engine. Another hose 65 with a second quick connect coupling from the oil exchanger apparatus is connected to the filter inlet connection 64 on the adapter 12 that fluidly communicates with the internal combustion engine 22 for introducing compressed air 70 and fluid into the internal combustion engine through the filter element and finally into the internal oil lubrication distribution passage system of the internal combustion engine for subsequent accumulation in the oil pan reservoir. The oil exchange apparatus 10 is electrically connected to an electrical energy force V as well as the vehicle electronic module 80 located in the vehicle for access to vehicle information and safety information to protect the engine and prevents the spilling of oil into the environment.

The oil exchanger 10 is activated upon initial start-up the oil exchanger by reading information from the vehicle electronic module 80 regarding the vehicles so that the oil change process is facilitated. Such information could include a vehicle I.D., the capacity of the oil pan 82, and a history of previous oil changes. Other pertinent information may also be read as needed. In addition, the oil exchanger also reads various signals for safety reasons. One such signal is the "oil filter securely in place" signal 83. The "oil filter securely in place" signal 83 tells the oil exchanger apparatus 10 whether or not the oil filter 38 is securely in place. If the oil filter 38 is not securely in place, the oil exchanger apparatus 10 will not activate the purge air or new oil filling process. The "oil filter securely in place" signal 83 could be generated preferably by a microswitch 84 embedded in the oil filter mounting face 34 such that when the oil filter 38 is installed onto the base of the oil mounting face 34 the oil filter 38 would press against the switch 84 which would close contact and thereby providing a signal 83 that the oil filter 38 is securely in place. When the oil filter 38 is removed from the oil mounting face 34, the switch 84 would open and thereby sending a signal 83 that there is no filter connection and deactivate the oil exchange apparatus 10 such that no air or oil can be introduced into the internal combustion engine. Alternatively, a signal 83 could be generated by a proximity switch 86, installed near the oil filter 38 which would sense the presence or absence of the filter 38 and thereby providing a similar signal 83 to the oil exchange apparatus 10.

An additional safety feature is provided by an oil pressure signal 87. The oil pressure signal notifies the oil exchange apparatus 10 whether or not there is oil pressure present. When oil pressure is present, the internal combustion engine is running. When the oil pressure signal 87 is activated, the oil exchange apparatus 10 remains deactivated and the user will be alerted to stop the engine. The oil exchange apparatus 10 will not proceed until the engine is stopped and confirmed by the oil pressure signal 87. The oil pressure signal protects the engine from running without oil in the lubrication passages. The oil pressure signal 87 may be generated by a pressure sensing device 88 installed on the vehicle, or the signal may be taken from an oil pressure sensor already present on the engine or the signal may be taken by an oil pressure sensor present in the oil fill module connected to the oil exchange apparatus. Once the oil exchange apparatus has determined that the oil filter 38 is correctly and securely in place and the engine is not running and has read and recorded the various pertinent information the oil exchange apparatus 10 may proceed with the oil changing system. The oil exchange apparatus introduces pressurized air 70 into the system to purge fluid from the oil filter element 38 thereby causing the residual spent oil retained within the oil filter 38 to be discharged through the internal oil lubrication distribution passage system to the oil pan reservoir 82 of the internal combustion engine 22. The air 70 enters the adapter bracket 12 through filter inlet connection 64 and passes through passage 46 through the filter 38, and into passages leading to the internal oil distribution passage system of the internal combustion engine 22. At the same time, the suction pump 78 located in the oil exchange apparatus starts drawing the oil out of the oil pan of the vehicle.

After completing the purging operation, the air introduction is deactivated to stop delivery of the compressed air 70. The suction pump 78 continues to draw fluid from the oil pan reservoir 82 through the drain line of the internal combustion engine and through fluid connection passages 52 leading to the oil drain connection 74 in the adapter 12 for discharge into the spent oil storage receptacle 90. After the oil pan reservoir 82 of the internal combustion engine has been emptied, the pump 78 is deenergized. The empty oil filter element 38 of the internal combustion engine can be removed any time after the air purge is complete and replaced with a clean filter element 38. Fresh oil can then be introduced into the internal oil lubrication distribution passage system by actuating the fresh oil supply 72 to allow flow to the internal combustion engine 22. A pump 68 is energized to draw fresh motor oil from the receptacle 72 for discharge into the internal combustion engine 22 through filter inlet connection 64 to the oil filter element 38 into the internal oil lubrication distribution passage system for accumulation in the oil pan reservoir 82 of the internal combustion engine 22. The fresh motor oil supply 72 follows the same path as was done by the compressed air 70 previously mentioned.

When an specified amount of fresh motor oil has been delivered to the internal combustion engine 22 by the pump 68 and as determined by the information provided to the oil exchanger by the vehicle electronic module 80, the pump 68 is deenergized. The quick disconnect couplings are then disconnected from the adapter 12. The internal combustion engine 22 is now ready for normal use with the oil filter element 38 having been precharged with fresh oil in engine components and oil passages and oil pan prelubricated with fresh filtered oil prior to starting the engine. The amount of fresh oil added can be recorded to the vehicle electronic module 80. Other information may also be stored in the electronic module 80, such as date, miles since previous oil change and the like.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for changing oil in an internal combustion engine of a vehicle having an engine block and an internal oil lubrication system with gallery passages, an oil filter and an oil reservoir with an oil capacity, the apparatus comprising:

means for evacuating fluid from said oil filter into said oil reservoir;

means for removing fluid from said oil reservoir;

means for introducing fluid into said oil reservoir through said oil filter and internal oil lubrication system, when said oil filter is in a communicating position;

means for monitoring the position of the oil filter relative to the internal oil lubrication system, wherein the oil filter is in a connect position when the oil filter is securely positioned on the internal oil lubrication system; and means for deactivating the fluid introducing means when the oil filter is in a position other than the connect position.

2. The apparatus of claim 1 further comprising:

means for monitoring an engine running condition of the internal combustion engine; and means for deactivating the removing of fluid means from the oil reservoir when the internal combustion engine is in the engine running condition.

3. The apparatus of claim 1 further comprising an oil filter bracket adapter mounted directly on the engine block for mounting the oil filter to the engine block in an upside down and vertical position.

4. The apparatus of claim 3, wherein said bracket adapter further comprises a first fluid passage in communication with the oil filter for connection to the fluid introducing means.

5. The apparatus of claim 4, wherein said bracket adapter further comprises a second fluid passage in communication with said oil reservoir for connection to the evacuating fluid means.

6. The apparatus of claim 5, wherein said bracket adapter further comprises a third passage for delivery filtered fluid from the oil filter to the main gallery passage.

7. The apparatus of claim 1, wherein the monitoring means for an oil filter position comprises a signal generated by a switch embedded in an oil filter mounting face of the bracket adapter.

8. The apparatus of claim 1, wherein the monitoring means for an oil filter position comprises a signal generated by a proximity switch installed on the bracket adapter near the oil filter.

9. The apparatus of claim 2, wherein the monitoring means for an internal combustion engine running condition comprises a signal generated by an oil pressure sensor.

10. The apparatus of claim 1 further comprising means for obtaining the oil capacity of the oil reservoir.

11. The apparatus of claim 1, wherein the apparatus is connected to an electronic module on board the internal combustion engine.

12. The apparatus of claim 1, wherein the apparatus is connected to an electronic module in communication with vehicle information.

13. An apparatus for changing oil in an internal combustion engine in a vehicle having vehicle information stored in an on-board computer chip, said internal combustion engine having an engine block and an internal oil lubrication system with a main gallery passage, an oil filter and an oil reservoir with an oil capacity, the apparatus comprising:

means for evacuating fluid from said oil filter into said oil reservoir;

means for removing fluid from said oil reservoir;

means for introducing fluid into said oil reservoir through said oil filter and internal oil lubrication system;

means for accessing the vehicle information;

means for monitoring an engine running condition of the internal combustion engine;

means for deactivating the evacuating fluid means when the internal combustion engine is in an engine running condition;

means for monitoring an oil filter connect position when the oil filter is securely positioned on the internal lubrication system; and means for deactivating the fluid introducing means when the oil filter is in a position other than the connect position.

\* \* \* \* \*